Figure 1:
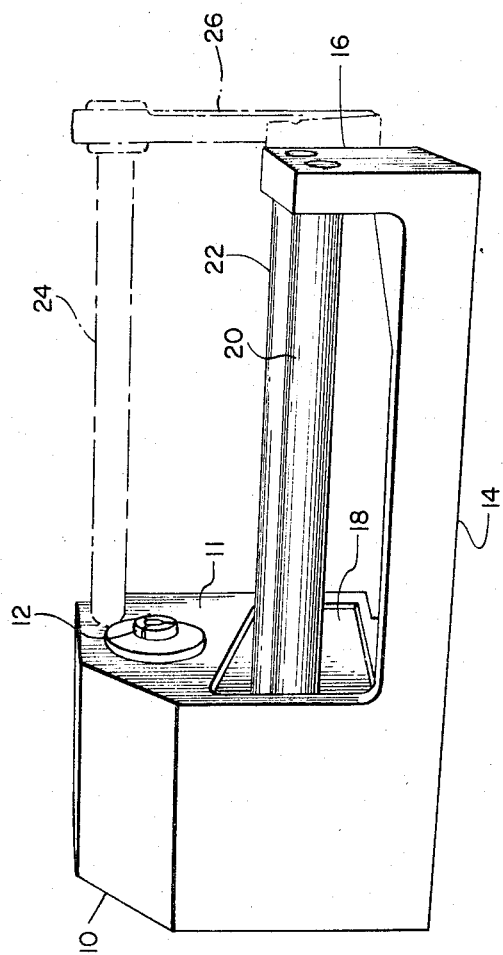

March 28, 1967 P. D. GEORGE 3,311,004
MODULAR LATHES

Original Filed May 15, 1964 4 Sheets-Sheet 1

INVENTOR
PETER D. GEORGE
BY
Morse, Altman & Oates
ATTORNEYS

INVENTOR.
PETER D. GEORGE

United States Patent Office 3,311,004
Patented Mar. 28, 1967

3,311,004
MODULAR LATHES
Peter D. George, 156 Crabtree Road,
Quincy, Mass. 02169
Original application May 15, 1964, Ser. No. 367,720.
Divided and this application June 27, 1966, Ser. No. 560,654
5 Claims. (Cl. 82—5.5)

This is a division of U.S. application Ser. No. 367,720 filed May 15, 1964.

This invention relates generally to lathe machinery and more particularly is directed towards a lathe base support and driving head in cooperation with a variety of interchangeable modules adapted to perform selected machining operations. This invention is also directed towards improvements in lathe components.

A lathe generically defines a machine adapted to remove metal from a workpiece by gripping it securely in a clamping device and rotating it under power against a suitable cutting tool. Lathes are able to perform a number of machining operations such as facing, boring and threading, and, depending upon the design of the machine, these operations may be carried out under manual, semi-automatic or completely automatic control. While machines of this type generally are quite versatile as a class, a specific lathe unit is relatively restricted as to its range of operations. For this reason, machine shops normally require several individual lathe machines, each adapted to perform certain machining operations for which each machine is particularly designed. Since each machine is a relatively expensive piece of equipment, a sizable capital outlay is required to properly outfit a machine shop.

Accordingly, it is a general object of the present invention to provide improvements in lathe machines.

Another object of this invention is to provide a basic lathe unit adapted to accommodate a variety of interchangeable modules for performing a variety of different machining operations.

Still another object of this invention is to provide a lathe machine which is readily convertible from one mode of operation to another.

A still further object of this invention is to provide a lathe machine with cooperating modules which may function on a manual, semi-automatic or completely automatic basis.

More particularly, this invention features a lathe comprising a basic driving head and cylindrical ways of hardened metal on which are selectively mounted interchangeable modules each adapted to perform one or more selected operations such as threading, boring, or the like. Certain ones of the modules may be programmed to cycle automatically and perform selected predetermined operations on a completely automatic basis. Other modules may be employed for semi-automatic operation while further modules may be operated manually for use in producing individual parts not suitable for automatic production.

Figure 2:
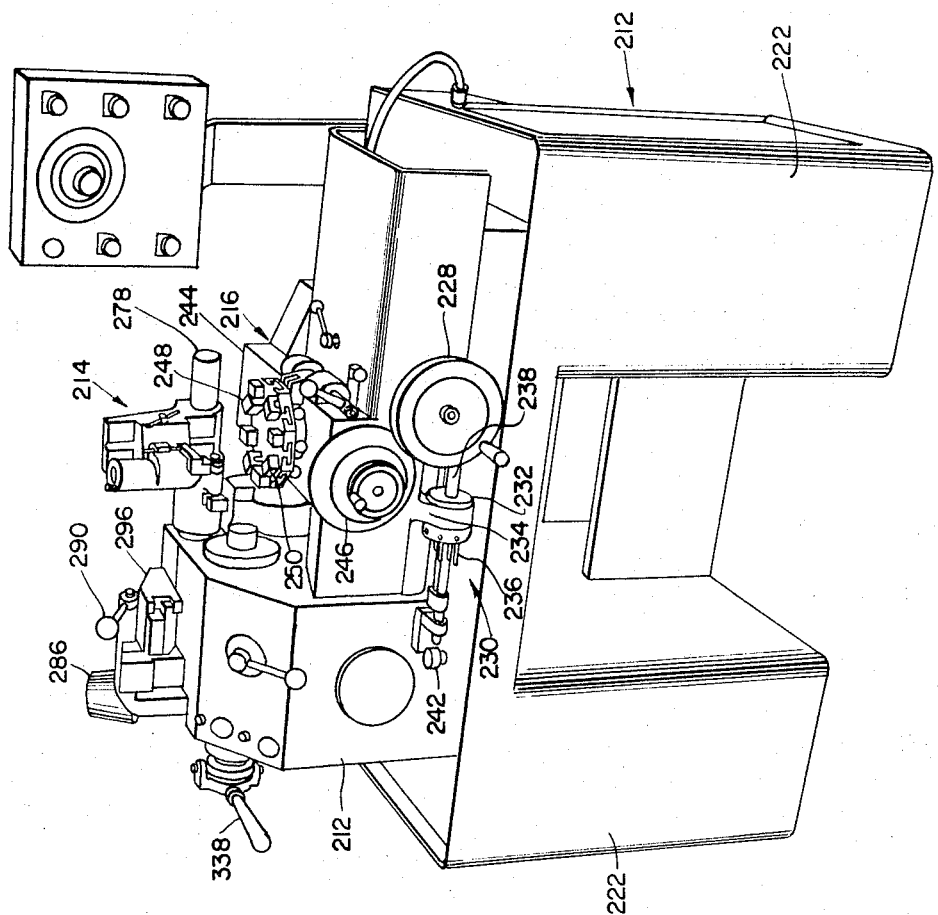
Figure 3:
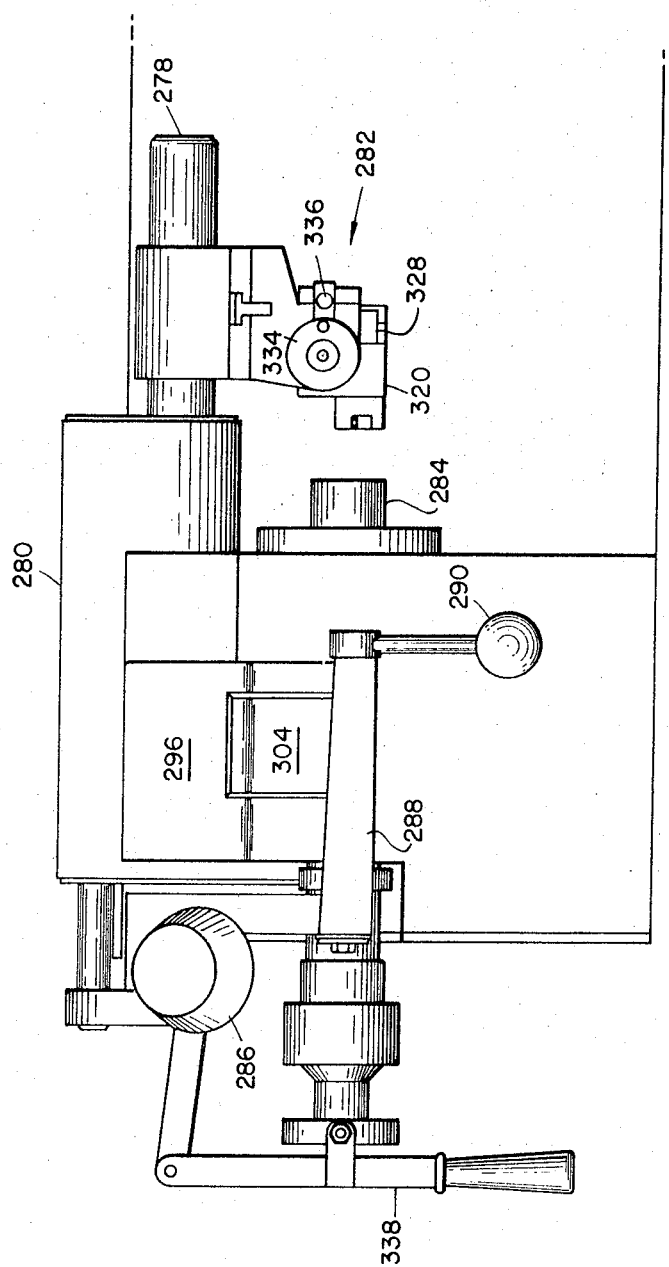
Figure 4:
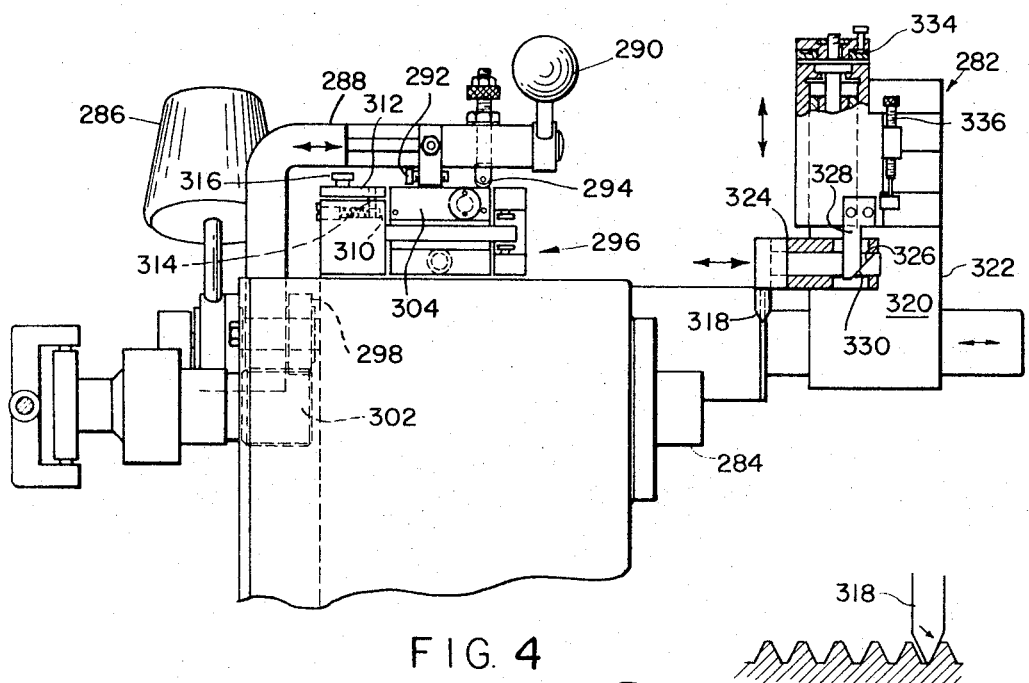
Figure 6:
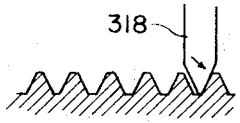
Figure 5:
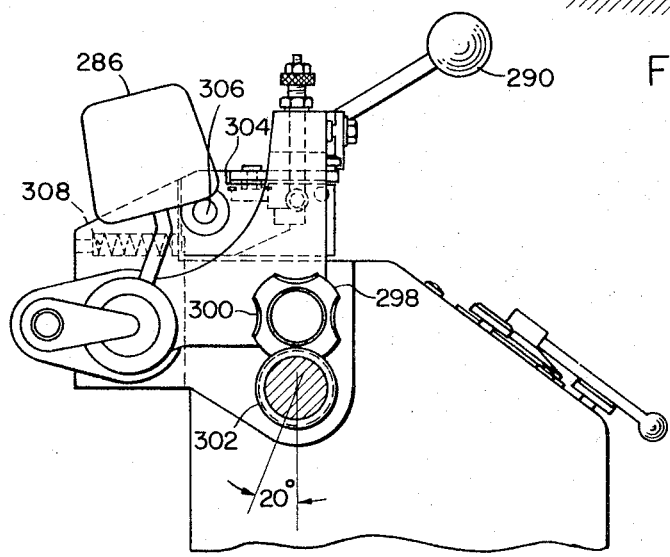

But these and other features of the invention, along with further objects and advantages thereof, will become more fully apparent from the following detailed description of preferred embodiments of the invention, with reference being made to the accompanying drawings in which:

FIG. 1 is a view in perspective of a lathe base and drive unit made according to the invention, FIG. 2 is a view in perspective showing a modified form of the lathe base and drive unit with a modular chucking unit attached thereto, FIG. 3 is a top plan view of a threading attachment module assembled on the chucker of FIG. 2, FIG. 4 is a fragmentary front elevation of the FIG. 3 threading attachment, FIG. 5 is an end elevation of the threading attachment, and FIG. 6 is a detail side section illustrating a thread cutting technique.

Referring now to FIG. 1 of the drawings, the basic lathe base and driving unit is generally organized about a housing 10 in which is mounted the necessary driving means for rotating a spindle 12 extending through a side wall 11 of the housing and adapted to receive a chuck or other device by which a workpiece may be mounted for rotation.

The unit includes a horizontally extending base portion 14 having an upright wall portion 16. The housing wall 11 is formed with a more or less wedge-shaped opening 18 wherein the upper edge of the opening is inclined rearwardly for reasons that will presently appear. Extending horizontally into the opening 18 is a pair of spaced parallel cylindrical ways 20 and 22 of hardened steel. The right hand ends of the ways 20 and 22 are mounted in the wall 16, while the left hand ends are supported within the housing 10. These ways are held in position by means of set screws and may be removed for mounting a modular unit as will presently appear or may be rotated from time to time to provide even wearing along their upper surfaces. With this arrangement precision operation of the unit is assured over an extended period of time despite heavy use of the machine. A third cylindrical way 24, shown phantom in FIG. 1, may be mounted rearwardly and above the ways 20 and 22 by means of an extension arm 26 mounted at its lower end to the base wall 16. The opposite end of the way 24 is mounted in the wall 11 of the housing 10.

Referring now more particularly to FIGS. 2 through 5, there is illustrated a modification of the invention and in this embodiment a modified lathe base 212 similar to the base of FIG. 1 is adapted to accommodate a threading attachment module 214 and a chucker module 216. The entire machine is mounted on a table 218, featuring a bin 220 which, when it is filled with chips and waste, may be tilted forwardly and downwardly into a suitable receptacle, emptied and then returned to a raised position.

Referring now more particularly to the threading attachment module 214 reference is made to FIGS. 3, 4 and 5 in particular where it will be seen that this module is organized generally about an arbor 278 rotatably mounted by means of a bracket 280 to the top rear portion of the gear housing for the base 212. The right-hand end of the arbor 278 carries a tool holder 282 which is adapted to cut the threads of the workpiece held by a collet 284. The opposite end of the arbor carries a counterweight 286 and an angular arm 288 which is normally extended over the top part of the gear housing. This arm has mounted thereto an operating handle 290, an adjustable stop 292 and a roller follower 294 which is adapted to normally ride along the flat upper surface of a release unit 296 mounted on top of the gear housing. Carried also by the arm 288 is a lead screw follower 298 which is formed with a plurality of concave arcuate sectors 300 each sector being formed with threads and the threads of each sector being of a different pitch. The lead screw follower may be indexed to different operating positions in order to bring to bear a selected sector 300 which in the position shown in FIG. 5 meshes with a lead screw 302. Thus, by selectively indexing one of the sectors 300 to mesh with the lead screw a tool holder 282 may be moved at different speeds. It will be understood that when the lead screw follower 298 is in mesh with the lead screw 302, the arbor 278 together with the arm 288 and the tool holder 282 will be moved axially. Different sectors 300 may be meshed into operating position by merely pushing back on the handle 290 to swing the arm 288 about the arbor axis and thus disengage the lead screw follower 298 to permit the lead screw follower to be rotated into a new indexed position.

Referring now more particularly to the release unit 296, it will be seen in FIGS. 3, 4 and 5 that this unit includes a pivoted head 304 hinged to a pin 306 and urged into a normally raised position by means of a spring 308 compressed between the head and the rear portion of the release unit. In practice, this spring mounted head is held in a down position so that its flat upper surface is flush with the remaining portion of the head 296. The locking mechanism for holding the head in a lowered position includes a spring loaded pin 310 normally urged to the right as viewed in FIG. 4 to engage a recess formed oppositely in the spring loaded head 304. A flat plate 312 in disposed above the spring loaded pin and is engaged therewith by means of a lug 134. On the top of the plate 314, there is a boss in the path of travel of the stop 292 and it will be understood that as the stop 292 is moved along the top of the release unit during a threading operation, it will come up against the boss 316 thereby retracting the pin 310 from the spring loaded head 304 so as to release the head from a lowered locked position. When released the head 304 will pivot upwardly, it will push against the follower 294 causing the arm 288 to be biased to an extent sufficient to disengage the lead screw follower 298 from the lead screw 302 and also to swing the tool holder 282 back sufficiently to disengage a cutting tool 318 from the workpiece. Thus, in a cutting stroke the tool is immediately disengaged and the advance of the tool is stopped.

Referring now more particularly to the tool holder 282, this unit is adapted to make an improved cut on the threads by advancing the tool 318 angularly into the work. In conventional threading machines, the tool is moved in and out right angularly with respect to the rotating work and the tool is shaped so as to form both sides of the thread simultaneously. This technique does not leave a particularly clean, smooth thread since the tool is more or less gouging out the metal from the workpiece rather than shaving it in the preferred lathe cutting manner. With the tool holder 282 as shown in FIG. 4, the tool 318 is arranged to move simultaneously inward and along the work so that only one side of a thread is being cut and this by the shaving technique. While one side of the thread is being cut, the opposite side is being cleaned so that the resulting threads will be smooth and clean.

The mechanism for producing this motion includes a tubular support 320 disposed horizontally and mounted for reciprocation to the tool holder frame 322. Slideably mounted within the tubular support 320 is a ram 324 which carries a tool 318 on the left hand end thereof as viewed in FIG. 4. The mid-portion of the ram 324 is formed with a diagnoal groove 326 to receive a cooperating push rod 328 also formed with a diagonal face 330 and adapted to reciprocate through a vertical plane. The vertical position of the tube support 320 and ram 324 is controlled by means of a manually operated feed screw 334 while the horizontal position of the ram is controlled by manually operated feed screw 336. It will be understood by selectively adjusting the feed screw 336, the push rod 328 may be moved through a vertical plane so as to move the ram and its tool to the right or to the left as desired. In practice, a spring is provided to urge the ram with its tool normally to the left as viewed in FIG. 4. Thus, as the push rod moves downwardly, the tool will be moved incrementally to the right to make a progressively deeper cut along one side of a thread. The horizontal and vertical adjustments of the tool produce at a resultant motion which is diagonal in order to produce the desired thread shaving technique described above and suggested in FIG. 6.

To the left hand side of the machine there is a levered yoke 338 which serves to open and close the collet jaws 284 for releasing and clamping a workpiece.

It will be appreciated that the modular lathe illustrated and described herein is particularly flexible insofar as different operating modules can be readily assembled on a common lathe base whereby with a relatively limited capital investment a unit capable of a variety of operations is made available. The use of hardened cylindrical ways makes assembly of the different modules particularly easy and also insures a long operating life of the ways since they may be rotated from time to time to insure even wearing.

While the invention has been described with particular reference to the illustrated embodiments, it will be understood that numerous modifications thereto will appear to those skilled in the art. Also, it will be understood that the above descripion and accompanying drawings should be taken as illustrative of the invention and not in a limiting sense.

Having thus described the invention, what I claim and desire to obtain by Letters Patent of the United States is:

1. Apparatus for cutting threads in a lathe held workpiece, rotating about the lathe axis, comprising
   (a) a support mounted to one side of said axis,
   (b) a slide mounted to said support for movement parallel to said axis,
   (c) first means for mounting a cutting tool on said slide for cutting engagement with said workpiece,
   (d) second means for moving said support together with said slide and tool along a path parallel to said axis, and
   (e) third means for moving said first means selectively along independent paths normal to said axis and parallel thereto.

2. Apparatus according to claim 1 wherein said third means includes said slide formed with a diagonally extending groove, a pusher mounted for reciprocation through said normal path, said pusher being operatively engaged with said groove and means for moving said pusher to thereby move said slide and tool and independent means for moving said support along said normal path.

3. Apparatus according to claim 1 including variable speed drive means operatively connected to said support for moving said support along said parallel path at a selected speed.

4. Apparatus according to claim 1 wherein said second means is movable to and away from said axis and release means for moving said second means away from said axis to disengage said tool from said workpiece at the end of a preselected travel of said tool.

5. A lathe, comprising a base, and threading module mounted thereto, said base including a lead screw, power means for rotating said lead screw, an arbor rotatably and slideably mounted to said base parallel to said lead screw, means mounting a cutting tool to one end of said arbor, an arm extending out from said arbor, a lead screw follower rotatably mounted to said arm and engageable with said lead screw, said follower being formed with a plurality of concave arcuate sectors, said sectors being formed with threads of different pitch whereby said arbor together with said tool may be moved axially at a selected speed by tilting said arm to engage a selected arcuate sector with said lead screw, said tool mounting means including a support, a horizontally movable slide for carrying said tool, said slide being formed with a diagonally extended groove, a pusher mounted for reciprocation through a path normal to said slide, said pusher being operatively engaged with said groove and means for reciprocating said pusher to reciprocate said slide and said tool and means for reciprocating said slide support through a vertical plane.

References Cited by the Examiner
UNITED STATES PATENTS

| | | | |
|---|---|---|---|
| 255,011 | 3/1882 | Norton | 82—5.5 |
| 3,165,769 | 1/1965 | Parsons et al. | 82—5.5 X |

WILLIAM W. DYER, JR., *Primary Examiner.*

LEONIDAS VLACHOS, *Examiner.*